United States Patent [19]

Perusich et al.

[11] Patent Number: 5,273,694
[45] Date of Patent: Dec. 28, 1993

[54] PROCESS FOR MAKING ION EXCHANGE MEMBRANES AND FILMS

[75] Inventors: Stephen A. Perusich; William H. Tuminello; Shoibal Banerjee, all of Newark, Del.

[73] Assignee: E. I. Du Pont de Nemours and Company, Wilmington, Del.

[21] Appl. No.: 935,350

[22] Filed: Aug. 28, 1992

[51] Int. Cl.$^5$ ............................................. B29C 67/20
[52] U.S. Cl. ...................... 264/41; 264/216; 264/331.14
[58] Field of Search ................ 264/41, 216, 331.14

[56] References Cited

U.S. PATENT DOCUMENTS

| | | | |
|---|---|---|---|
| 4,266,036 | 5/1981 | Baczek et al. | 521/26 |
| 4,272,560 | 6/1981 | Baczek et al. | 427/58 |
| 4,298,697 | 11/1981 | Baczek et al. | 521/27 |
| 4,421,579 | 12/1983 | Covitch et al. | 156/60 |
| 4,535,112 | 8/1985 | McCain et al. | 524/233 |
| 4,540,716 | 9/1985 | Covitch et al. | 521/28 |
| 4,650,551 | 3/1987 | Carl et al. | 204/59 |
| 4,698,243 | 10/1987 | Carl et al. | 427/341 |
| 4,778,723 | 10/1988 | Carl et al. | 428/394 |
| 4,784,900 | 11/1988 | Carl et al. | 428/265 |
| 4,808,651 | 2/1989 | Blickle et al. | 524/366 |
| 5,066,682 | 11/1991 | Miyazaki et al. | 521/27 |

OTHER PUBLICATIONS

Abstract of Japan 55-79,048 (published Jun. 1980).
Abstract of Japan 55-149,336 (published Nov. 1980).
Abstract of Japan 57-182,345 (published Nov. 1982).
Abstract of Japan 57-182,346 (published Nov. 1982).
Abstract of Japan 57-185,337 (published Nov. 1982).
Abstract of Japan 63-286,442 (published Nov. 1988).
Article "Solubility Characteristics of Perfluorinated Polymers with Sulfonyl Fluoride Functionality" by G. N. McCain and M. J. Covitch, J. Electrochem. Soc.-:Electrochemical Science and Technology (Jun. 1984) pp. 1350-1352.

*Primary Examiner*—Leo B. Tentoni
*Attorney, Agent, or Firm*—Cary A. Levitt

[57] ABSTRACT

Ion exchange membranes or films are made from a solution of perfluorinated cycloalkanes, perfluorinated aromatic compounds and perfluorotrialkyl amines having a critical temperature greater than 150° C. and certain carboxylic fluorinated polymers having an equivalent weight greater than 900. A process for repairing ion exchange membranes and films by spray coating the surface of the membrane or film with the solution is also disclosed. The ion exchange membranes and films are useful in chloralkali cells or fuel cells.

5 Claims, 1 Drawing Sheet

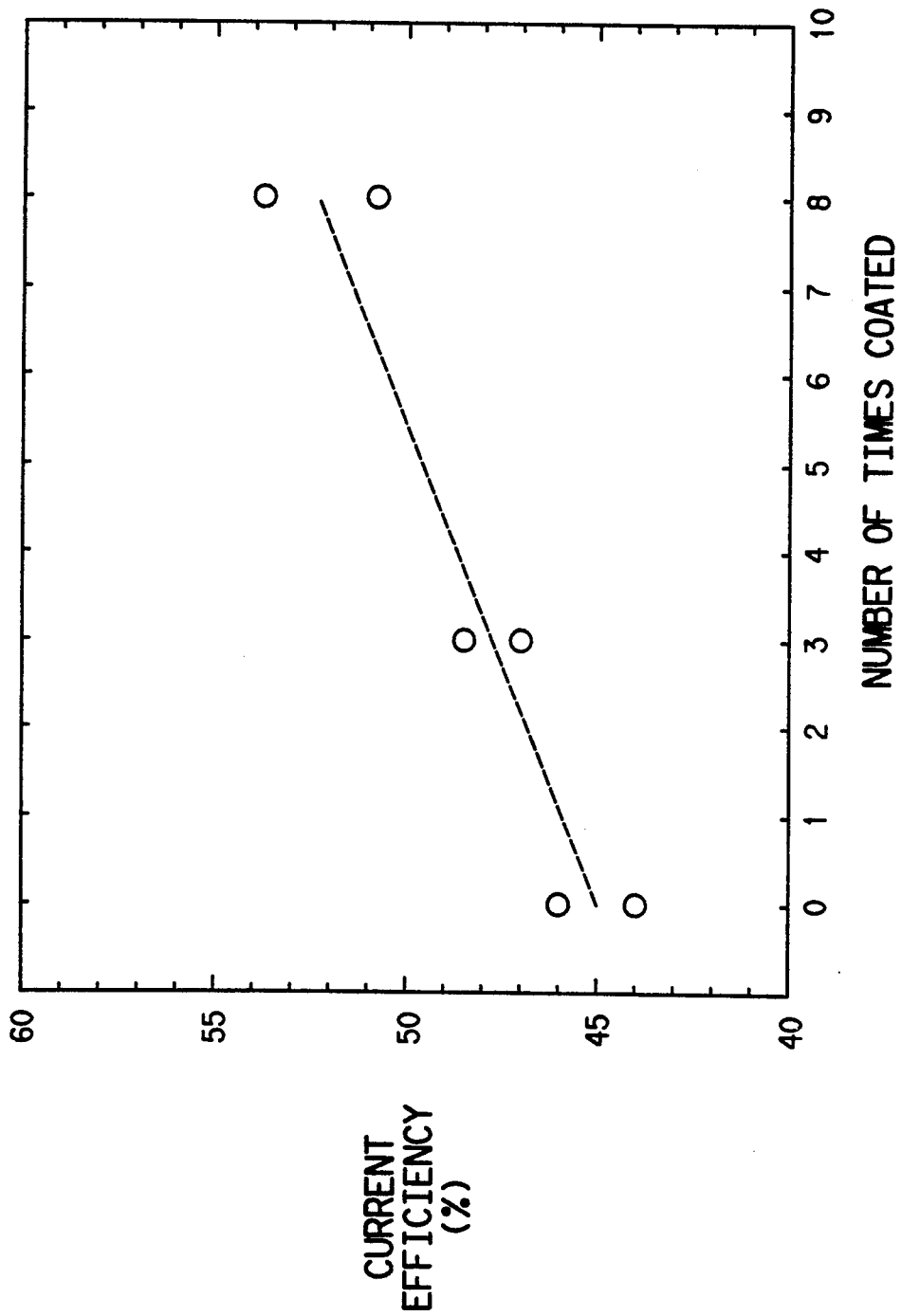

PROCESS FOR MAKING ION EXCHANGE MEMBRANES AND FILMS

BACKGROUND OF THE INVENTION

1. Field of the Invention

A process for making or repairing ion exchange membranes from a solution of fluorinated polymers is disclosed. The solution comprises perfluoro cycloalkane, perfluorinated aromatic compounds or perfluorotrialkyl amine solvents and fluorinated polymers having carboxyl groups and an equivalent weight greater than 900. The solvents have a critical temperature greater than 150° C.

2. Technical Background

The present invention relates to electrolytic cells and particularly to electrolytic halogen generating cells in which an ion exchange membrane separates the anode and cathode within the electrolytic cell. Specifically, this invention relates to methods for making and for repairing these ion exchange membranes. More specifically, this invention concerns a process for making ion exchange membranes from solutions of fluorinated polymers having carboxyl groups and an equivalent weight greater than 900. The solutions are made from novel solvents which dissolve certain alkyl carboxylate forms of fluorinated polymers which are copolymers of tetrafluoroethylene ("TFE") and certain perfluorovinylether comonomers. The solvents readily dissolve such polymers more completely and at lower temperatures than previously disclosed solvents, an advantage in equipment utilization and other manufacturing concerns. The ion exchange membranes are particularly useful in an electrolytic cell such as a chloralkali cell or a fuel cell. The solutions are also useful as corrosion resistant spray coatings for a multitude of materials.

The prior art generally discloses the solubility of certain fluorinated polymers but there is no mention of full solutions of carboxylic fluorinated polymers having high equivalent weights in this class of inventive solvents, particularly at low temperatures. There is also no mention of a process to make or repair ion exchange membranes from such solutions.

Generally, ion exchange membranes are between 0.5 and 150 mil in thickness. Being thin, these membranes, while strongly resistant to the chemical environment within the electrolytic cell or fuel cell, are often subject to physical damage: tears, punctures and flex fatigue cracking. One past proposal has been to repair this physical damage using low equivalent weight copolymer solvated with an alcohol. It is difficult to fully dissolve the polymers in an alcohol solvent. In addition, the repaired areas have not offered desirable membrane performance characteristics normally associated with higher density copolymeric material, resulting in decline of the overall performance of the membrane. These repairs often have achieved less than desirable adhesion to the membrane because mechanical bonding not solvent molding is a significant factor in adhesion.

The use of alcohols to solvate particularly low equivalent weight perfluorocarbon copolymers is known. However, as yet, proposals for formation of perfluorocarbon composite electrodes and for solvent welding the composites to perfluorocarbon membranes where the perfluorocarbons are of relatively elevated equivalent weights desirable in, for example, chlorine cells, have not proven satisfactory. Dissatisfaction has been at least partly due to a lack of suitable techniques for fully solvating these higher equivalent weight perfluorocarbons.

Some solvents are known in the prior art for this class of carboxylic fluorinated polymers; however, some of the solvents are very expensive or require high temperature to dissolve the polymer. The prior art teaches solvents for carboxylic fluorinated polymers with equivalent weights below about 900 and solvents for such polymers which require elevated temperatures or pressures. There is no teaching of a solvent for the ester form of carboxylic fluorinated polymers with an equivalent weight greater than 900 at low temperatures.

For example, U.S. Pat. Nos. 4,650,551; 4,778,723 and 4,784,900 disclose solutions near room temperature of highly swollen dispersions of resins which are copolymers of TFE and perfluorovinylether comonomers with acidic end groups having low equivalent weights less than 850. Heavily fluorinated alkanes, like 1,2-dibromotetrafluoroethane and 1,1,2-trichlorotrifluoroethane were used as "solvents". Examples of room temperature solutions were also given using polyhalogenated alkyl ethers with boiling points less than 190° C.; the equivalent weight for these resins was exceedingly low at 690 or lower.

Fluorinated polymer resins commercially known as NAFION ® (available from E. I. du Pont de Nemours and Company) with an equivalent weight greater than about 1000, must be dissolved at elevated temperatures and pressures due to the presence of crystallinity. U.S. Pat. Nos. 4,266,036; 4,272,560 and 4,298,697 discuss the use of high boiling perhalogenated alkyl ethers and perhalogenated alkanes as solvents at elevated temperatures. The examples describe the dissolution of 1050 to 1200 equivalent weight resins in oligomers of chlorotrifluoroethylene ("CTFE") at temperatures of about 225° to 250° C.; however, the polymers are more likely to decarboxylate at high temperatures. Chemical degradation of the polymer may occur in solutions of CTFE oligomer at 200° C.

U.S. Pat. No. 4,535,112 describes a method of repairing ion exchange membranes using dispersions or partial solutions of 1050 to 1200 equivalent weight polymers in a wide variety of heavily fluorinated liquids for purposes of repairing cation exchange membranes. These liquids include perfluorodecanoic acid, perfluorotributylamine, pentafluorophenol, pentafluorobenzoic acid, perfluoro-1-methyldecalin and decafluorobiphenyl. There is no mention of full solutions of carboxylic fluorinated polymers having high equivalent weights at low temperatures.

An article entitled "Solubility Characteristics of Perfluorinated Polymers with Sulfonyl Fluoride Functionality" by McCain and Covitch discusses the solubility of so-called sulfonyl fluorinated polymers, but does not mention alkyl carboxylate forms of fluorinated polymers.

SUMMARY OF THE INVENTION

This invention concerns a process for making or repairing ion exchange membranes from a solution of alkyl carboxylate forms of fluorinated polymers and a solvent which is a perfluorinated cycloalkane, perfluorinated aromatic or perfluorotrialkylamine. Solutions may be obtained at about 150° C. at autogenous pressure and some of the solutions are stable at room temperature. The inventive solvents are non-toxic, non-flammable, inert, relatively inexpensive and easy to handle. The ion exchange membranes may be made from the solution by casting the solution to form a film or by spray coating a fabric or other support. This method is particularly useful to make thin films or membranes. The ion exchange membrane may also be repaired by applying the polymer solution, preferably via spray coating, to a portion of the membrane. A membrane made by the inventive process is also claimed.

BRIEF DESCRIPTION OF DRAWINGS

FIG. 1 is a graph showing improved current efficiency of a membrane in a chloralkali cell with the progressive spray coating of a solution of fluorinated polymer having carboxyl groups onto a film of fluorinated polymer having sulfonyl groups.

DETAILS OF THE INVENTION

The present invention provides a method and compound for making and repairing perfluorocarbon membranes using a solution of fully solvate perfluorocarbon having carboxyl groups.

The polymers useful to make the ion exchange membranes are fluorinated, which means that at least 90%, preferably at least 95%, and most preferably all of the atoms attached to the carbons are F atoms or side-chain ether groups, which may contain functional groups hydrolyzable to salts. The non-fluorine atoms, if used, may be H, Cl or Br. The fluorinated polymers are the so-called carboxyl polymers and are in the methyl ester form.

The carboxyl polymers have a fluorinated hydrocarbon backbone chain to which are attached side chains carrying, before hydrolysis to the salt form, certain functional groups hydrolyzable in an alkaline medium to carboxylate groups, such as nitrile or ester groups. These polymers include, e.g., those containing the $-(OCF_2CFY)_n-O-CF_2-CF_2-W$ side chain, where Y is F or $CF_3$; n is 0, 1 or 2; and W is COOR or $-CN$, where R is lower alkyl. Among these polymers, those with n=1 and Y=$CF_3$ are preferred. The carboxylic polymers may be treated with a material such as trimethylorthoformate or methanol to insure complete conversion to the ester form.

Preferably, the fluorinated polymers are stored under vacuum in a desiccator to prevent hydrolysis by atmospheric moisture. The resins should be removed from the dessicater just prior to use.

Polymerization can be carried out by the methods well known in the art. Especially useful is solution polymerization using 1,2,2-trichlor-2,1,1-trifluoroethane as the solvent and perfluoropropionyl peroxide as the initiator. Polymerization can also be carried out by aqueous granular polymerization. All of these polymers are known to those skilled in the art, and many are items of commerce.

Compounds useful herein as solvents are perfluoroinated cycloalkanes, perfluorinated aromatic compounds and perfluorotrialkylamines. Such solvents must have a critical temperature above about 150° C.

Perfluorinated cycloalkanes are saturated cyclic compounds which may contain fused or unfused rings. The cycloalkane compounds may be substituted by perfluoroalkyl and perfluoroalkylene groups. Perfluoroalkyl groups are a saturated branched or linear carbon chain. Perfluoroalkylene group are an alkylene group which is branched or linear and connects two different carbocyclic rings. The total number of carbon atoms in all of the perfluroalkyl and perfluoroalkylene groups in a molecule of the solvent are preferably less than the total number of carbon atoms in the carbocyclic rings of the solvent molecule. It is preferred if there are at least twice as many carbon atoms in the rings of the solvent molecule as there are atoms in the perfluoroalkyl and perfluoroalkylene groups. Perfluorinated aromatic compounds are similar to perfluorocyclic alkanes, provided that one or more of the constituents is a phenyl group. The perfluorinated aromatic compounds may also be substituted with perfluoroalkyl groups or perfluoroalkylene groups. Perfluorotrialkyl amines include, for example, perfluorotrihexyl amine.

In order to ensure that the solvent will actually dissolve the polymer, the critical temperature of the solvent should be about 150° C. or higher, preferably about 180° C. or higher. The critical temperature is that temperature at which the polymer visually dissolves in the solvent.

Compounds useful as solvents herein include, but are not limited to, hexafluorobenzene, perfluoromethylcyclohexane, perfluorodecalin, perfluorotetradecahydrophenanthrene, and perfluorotrihexylamine, preferably perfluorotetradecahydrophenanthrene. It is believed that perfluorotetradecahydrophenanthrene is the best solvent for the carboxylic fluorinated polymers because it had a sufficiently high critical temperature (and boiling point) to readily dissolve the polymers at atmospheric pressure.

The process of dissolving the fluorinated polymer is carried out at the temperature required to dissolve the polymer. One may use atmospheric or autogenous pressure. The minimum temperature required can be determined by simple experimentation and will vary with the polymer and solvent. Generally, lower melting polymers will require lower temperatures, while higher melting polymers will require higher temperatures. The temperature must not be above the critical temperature of the solvent, so the critical temperature of the solvent must be above the temperature of dissolution.

In the present process the solvent and fluorinated polymer must be stable at the process temperature. For example, exposure of the hot polymer to active metals such as aluminum may cause polymer decomposition. Stirring or other forms of agitation will increase the rate of dissolution of the polymer. Other factors which influence the rate of dissolution and their effect are: higher interfacial surface area between the polymer and solvent gives faster rates, and higher polymer molecular weight and higher polymer concentrations give slower rates of dissolution. Dissolution will also generally be faster when the initial polymer is more finely divided. The time required for dissolution will vary with the particular polymer and solvent chosen, the temperature, the pressure as well as the other factors discussed above, but generally will be in a the range of a few minutes to a few hours. Dissolution can be followed visually. As discussed above, dissolution of the described polymers in the solvents of the instant invention is faster and more complete than in solvents previously known for these polymers.

The polymer concentration in solution is generally about 1 to 5 percent by weight, but the higher the molecular weight of the polymer, the more difficult it is to make relatively concentrated solutions due to longer dissolution times and higher solution viscosity. Preferred ingredients for the process are the same as given for the solution composition above.

The solution of fluorinated polymer may be made by the following preferred procedure: The solvent and polymer are added to a vessel. The relative amounts of polymer and solvent are such so as to provide a 1 to 5% solution by weight of the polymer (see individual Examples). Preferably, the vessel is about one-half full. The vessel is then heated and refluxed with a water condenser or the like. The temperature of the vessel can be controlled to $\pm 0.5°$ C. The temperature is then increased until the polymer is completely dissolved.

The solution is then used to fabricate ion exchange films or membranes by solution casting, spray coating or other methods known in the art.

For example, a reinforcing cloth made from, for example, polytetrafluoroethylene (PTFE) or expanded PTFE may be impregnated with solutions of fluorinated polymers having carboxyl groups. Until now the membranes have been fabricated from alcohol/water mixtures made from the neutralized resins at high temperatures and pressures. The inventive solvents dissolve the fluorinated polymers at atmospheric pressure to avoid the use of autoclaves. The solution may then be solution cast into a film by methods well known in the art or painted or coated on a reinforcing cloth to provide the ion exchange membrane by methods well known in the art.

The copolymers used in the manufacture of membrane layers used in the process of the present invention should be of high enough molecular weight to produce films which are self-supporting in both their melt-fabricable (precursor) form and in the hydrolyzed ion exchange form.

A membrane having a least one layer of a copolymer having sulfonyl groups in melt-fabricable form, can be used as one of the component films in making, by hydrolysis, the membrane to be used in an electrolytic cell.

It is also possible to use an all-carboxylate membrane with a layer or coating of lower equivalent weight on the anolyte side.

The membrane may also comprise three layers, for example:
a) on the catholyte side, a carboxylate layer of a 5–50 micrometer thickness, preferably 20–40 micrometers, with an equivalent weight suitable to provide a water transport of 3.0–4.0 moles of water per gram-atom of Na,
b) in the middle, an optional carboxylate layer with a lower equivalent weight and a thickness in the same range, as that of (a), and
c) on the anolyte side, a sulfonate layer of a 50–250 micrometer thickness, preferably 75–100 micrometers.

Membranes usually have an overall thickness of 50–300 micrometers, especially 125–200 micrometers.

The customary way to specify the structural composition of films or membranes in this field is to specify the polymer composition, ion-exchange capacity or equivalent weight, and thickness of the polymer films or membranes. This is done because the measured thickness varies depending on whether the membrane is dry or swollen with water or an electrolyte, and even on the ionic species and ionic strength of the electrolyte, even though the amount of polymer remains constant.

In the ester form, the resins can be melt processed. For use in electrolysis of brine or for use in a fuel cell, the membrane should have all of the functional groups converted to ionizable functional groups to obtain the desired electrochemical properties. These will be carboxylate groups, preferably the sodium or potassium salts thereof.

Conversion to ionizable functional groups is ordinarily and conveniently accomplished by hydrolysis with acid or base, such that the various functional groups described above in relation to the melt-fabricable polymers are converted respectively to the free acids or the sodium salts thereof. Such hydrolysis can be carried out in an aqueous bath of either a mineral acid or sodium hydroxide. Alkaline hydrolysis is preferred as it is faster and more complete. Use of hot hydrolysis baths, such as near the boiling point of the solution, is preferred for rapid hydrolysis. The time required for hydrolysis increases with the thickness of the structure. It is advantageous to include in the hydrolysis bath a water-miscible organic compound such as, e.g., dimethyl sulfoxide, to swell the membrane and thus increase the rate of hydrolysis.

The equivalent weight depends somewhat on the structure of the salt-containing side chain on each polymer. It may be obtained by using a mole ratio of tetrafluoroethylene to the comonomer in the carboxylate copolymer of 5.0–8.2, preferably 6.0–7.4. In the case where the carboxylate side chains are salts of $-OCF_2-CF(CF_3)-O-CF_2-CF_2-COOH$, the broad equivalent weight of the nonporous layer or coating in contact with the catholyte should be 908–1230, and the preferred equivalent weight will be 1008–1150. Equivalent weight is the weight in grams of polymer containing one equivalent of acid which can also be expressed as the comonomer molecular weight plus 100 n (n is the number of moles of TFE per mole of comonomer). Lower equivalent weight polymers tend to lack sufficient strength due to low levels of crystallinity. The TFE units are the crystallizable components; below about 1000 equivalent weight, the TFE concentration is too low to form the required amount of crystallinity.

The membrane may be unreinforced film or bifilm, but for dimensional stability and greater notched tear resistance, it is common to use a reinforcing material. It is customary to use a fabric made of a fluorocarbon resin such as polytetrafluoroethylene or a melt-processable copolymer of tetrafluoroethylene with hexafluoropropylene or with perfluoro(propyl vinyl ether). These may be woven into fabric using various weaves, such as the plain weave, basket weave, leno weave, or others. Relatively open weaves are preferred because the electric resistance is lower. A porous sheet may be used as a support. Other perhaloganated polymers such as polychlorotrifluoroethylene may also be used, but perfluorinated supports have the best resistance to heat and chemicals. The fibers used in the support fabrics may be monofilaments or multifilament yarns. They may be of ordinary round cross-section or may have specialized cross-sections. Oblong or rectangular cross-sections, if suitably oriented to the membrane, make it possible to get more reinforcing action with a thinner overall membrane. It may be desirable to use sacrificial fibers such as rayon, paper, or polyester, along with the fluorocarbon fibers. Care should be taken, however, not to have the soluble or degradable fibers extend from one surface to the other lest the nonporous membrane become a porous diaphragm, and the caustic product contain too much salt. Even with a cloth or mesh of fluorocarbon fibers, it is preferred not to have the cloth penetrate the surface of the membrane on the cathode side. The fabric employed may be calendered before lamination to reduce its thickness. In a bimembrane, the fabric may be in the sulfonate or carboxylate layer, or in both, but is more often in the sulfonate layer, which is usually thicker. In place of fabric, fibrils can be used.

One of the uses for the membrane made by this invention is electrolysis, particularly the electrolysis of NaCl or KCl to make NaOH or KOH, respectively.

The membrane or bimembrane may be used flat in various known filter press cells, or may be shaped around an electrode. The later is especially useful when it is desired to convert an existing diaphragm cell to a membrane cell in order to make higher quality caustic.

Membranes can be swelled with polar solvents (such as lower alcohols or esters, tetrahydrofuran, or chloroform) and then dried, preferably between flat plates, to improve their electrolytic performance. Before mounting in commercial cell support frames, which may be 1–5 meters on a side, the membrane can be swelled so that it will not wrinkle after it is clamped in the frame and exposed to electrolytic fluids. Among the swelling agents that can be used are water, brine, sodium bicarbonate solution, caustic, lower alcohols, glycols, or mixtures thereof.

The cell can have two or three compartments, or even more, If three or more compartments are used, the membrane is commonly placed next to the cathode compartment, and the other dividers may be porous diaphragms or membranes based on polymers having pendant side chains with terminal $-CF_2-SO_3Na$ groups only. The cells may be connected in series (so-called bipolar cells) or in parallel (so-called monopolar cells).

The membrane may be disposed horizontally or vertically in the cell, or at any angle from the vertical. Any of the conventional electrodes or electrode configurations may be used.

A binder component may be applied to the nonelectrode layer. The binder component in the nonelectrode layer can be, for example, polytetrafluoroethylene, a fluorocarbon polymer at least the surface of which is hydrophilic by virtue of treatment with ionizing radiation in air, or a modifying agent to introduce functional groups such as $-COOH$ or $-SO_3H$ or treatment with an agent such as sodium in liquid ammonia, a functionally substituted fluorocarbon polymer or copolymer which has carboxylate or sulfonate functional groups, or polytetrafluoroethylene particles modified on their surfaces with fluorinated copolymers having acid-type functional groups. Such binder can be used in an amount of about from 10 to 50 weight percent of the nonelectrode layer. In addition to the inorganic component and the binder, the dispersion used to apply the inorganic component can include a thickener such as methyl cellulose or polyvinyl alcohol and a small amount of nonionic surfactant.

Composite structures having nonelectrode layers thereon can be made by various techniques known in the art, which include preparation of a decal which is then pressed onto the membrane surface, spray application of a slurry in a liquid composition (for example, dispersion or solution) of the binder followed by drying, screen or gravure printing of compositions in paste form, hot pressing of powders distributed on the membrane surface, and other methods disclosed in the art. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

On the anolyte side, the membrane may have a bubble release coating. This may be a nonelectrode coating as described above, and suitably may be $ZrO_2$. Another way to provide this gas-release coating is to provide optimum surface roughness or smoothness by hot roll embossing or by embossing with a porous paper. When embossing with a porous paper, a release paper can be applied to an outer surface of the membrane prior to passing through a laminator used, for example, to incorporate a reinforcement in the membrane. Preferably, the resulting surface roughness is about 2–5 micrometers as measured, for example, with a Bendix Model 1020 profilometer.

The method of the present invention improves control of the process for making ion exchange membranes. Because polymerization and extrusion yields are inconsistent for current methods of making ion exchange membranes, the resulting membranes are often inhomogeneous. The so-called "solution process" for making membranes may produce a more homogeneous membrane with less reliance on control of the upstream process. Also, better inventory control may be realized because it will be possible to custom-make membranes by, for example, keeping standard films in stock and spraying on custom layers of perfluorinated polymer, depending on the application. This is earier and more cost effective than making many rolls of various membranes and keeping them in inventory. Solutions could then be fabricated on an as-needed basis so inventories would be decreased significantly.

The homogeneous solution-made membranes should also exhibit more even current distribution, leading to the use of higher current densities, which is particularly useful in fuel cells. The physical properties of the membrane may also be improved. For example, solution cast composite membranes may exhibit improved bonding between layers. Moreover, solution cast composite membranes can now be made by blending different fluorinated polymers in solution, thereby permitting mixing on a microscopic level.

In the method of repairing the ion exchange membrane, defects in the membrane are repaired by patching with a solution of perfluorocarbon polymer having carboxyl groups or a blend of a perfluorocarbon polymer having carboxyl groups with a perfluorocarbon polymer having sulfonyl groups.

The solution is applied to the membrane, covering any defects, and the solvent is removed. Removal can be accomplished using heat and/or vacuum. Alternate application of the solution and subsequent removal of desired thickness is built up upon the portion of the membrane being repaired.

In preferred embodiments, the solution is applied at a relatively elevated temperature; but also may be performed at temperatures at or somewhat above room temperature. From time to time, it may be desirable to embed a fabric mesh in the solution being applied to a membrane under repair. The mesh adds strength to repairs made to the membrane. The solution is preferably removed at relatively elevated temperatures.

The membrane preferably has the same pendant functional groups as the polymer in solution, and most preferably both perfluorocarbons are soluble in the solvent. A strong bonded patch thereby results on the membrane. The equivalent weight of the copolymeric perfluorocarbons can be the same, or different, but are generally of a relatively elevated equivalent weight to avoid possible damage by aggressive chemicals within the electrolytic cell or fuel cell.

Removal of the solvent can be accomplished using a heat of between ambient temperature and about 250° C. and/or a vacuum. Any suitable heating source, such as infra-red, heated air, or a heated, relatively nonstick surface, can be used for applying heat.

Pressure, up to about 4000 pounds per square inch (psi), but generally between zero and about 1000 psi, can be used to enhance coadherence between the patch and the membrane. Whether pressure is necessary depends, among other things, upon the degree to which the membrane perfluorocarbon is soluble in the solvent and the temperature at which patching is applied and solvent is removed.

The thickness of any patch or repair applied using the method of the instant invention is somewhat dependent upon the quantity of patching material applied per unit area of the membrane being repaired. Excessively thick patches may spall or delaminate during removal of the solvent and may present an unacceptably elevated resistance to ion migration during operation of the membrane by virtue of thickness. Repairs insufficiently thick may rupture or tear when installed in an electrochemical cell. A good guideline for determining repair thickness is that the patch material should be between about 0.5 and 1.0 times the thickness of the membrane, the actual preferred thickness being at least, in part, a function of the particular perfluorocarbons. Where patches on the order of more than a few mils are to be applied, application is preferably accomplished by more than one cycle of application of the solvent resulting in a layered patch.

As noted above, where the repaired membrane is to be subjected to a stressful physical environment in use, it may be desirable to reinforce the patching perfluorocarbon. Reinforcement can be accomplished by embedding a suitable or conventional reinforcing structure such as a fabric mesh or a screening in one or more layers of the patching compound being applied. Any such reinforcing structure should be embedded in patching perfluorocarbon for a distance surrounding patch areas requiring reinforcement to assure a firm anchor with the membrane.

Patching perfluorocarbon dispersion can be applied in any suitable or conventional manner such as by the use of painting, spraying, troweling and the like. With mechanical applicators, care is required to avoid additional mechanical damage to the membrane being repaired.

Solutions of the fluorinated polymers are also useful for determining molecular weight distributions of the polymer to better control plant manufacture. The classical methods for polymer molecular characterization rely on dilute solutions. For example, molecular weight distribution is usually determined by size exclusion chromatography which relies on other dilute solution techniques for calibration to get absolute values. The polymer is fed to the chromatograph in dilute solution. Calibration can include osmometry, light scattering and intrinsic viscosity measurements. Until now, it has not been possible to make an inexpensive, non-toxic, fully dissolved solution of these fluorinated polymers at atmospheric pressure and low temperature for purposes of measuring molecular weight distributions. The polymer solution also advantageously makes other analytical techniques for determining properties of the polymers (such as solution rheology, gas permeation chromatography and light scattering) available.

The solution of fluorinated polymers has other advantageous uses, particularly the solution is useful to make polymer coated electrodes. In particular, the solution could be sprayed directly onto electrodes for applications in sensors, photoelectric devices, and membrane and electrode cells.

EXAMPLES

Solution Preparation

All solutions were made with perfluorotetradecahydrophenanthrene ($C_{14}F_{24}$) solvent (commercially available as FLUTEC PP11). A 1000 ml round-bottom flask was fitted with a condenser and thermometer and partially encased in a heating mantle. A measured volume of solvent was added to the flask followed by a weighed amount of polymer. The polymers used were:
Ground NAFION ® CR (1062 EW)
Ground NAFION ® XR (1137 EW)
Solutions made were:
(1) 1% unhydrolyzed NAFION ® CR in $C_{14}F_{24}$
(2) 5% unhydrolyzed NAFION ® CR in $C_{14}F_{24}$
(3) 1 part NAFION ® CR/4 parts NAFION ® XR blend in a 1% $C_{14}F_{24}$ solution
(4) 5 part NAFION ® CR/4 parts NAFION ® XR blend in a 5% $C_{14}F_{24}$ solution The procedure to make the solution once all ingredients were added to the flask was to heat the flask to approximately 215° C. or lower before pouring it either into a storage flask, mold or weighing dish.

Solution Casting

A glass mold consisting of a 4.125" diameter flat-bottomed section connected to a 2" by 1.5" rectangular area was used to make ion exchange films.

A NAFION ® XR film was fitted to the inside of the mold. A 1% NAFION ® CR solution was poured on top of the NAFION ® XR film (5 mil, 1100EW), and the solvent was allowed to evaporate at 160° C. in a vacuum oven. Upon examination of the "bifilm" after drying, the solution dissolved the underlying film. The result was flaky-type film segments. The film was checked with Fourier Transform Infrared Spectroscopy ("FT-IR") and the resulting spectrum displayed both XR and CR character indicating a blend was formed. The XR and CR could not be separated, indicating excellent blending. This "microscopic" blending cannot be achieved by present extrusion or mixing techniques.

Spray Coating

To achieve thin ion-exchange films or coatings on two dimensional or three dimensional surfaces, parts were spray coated. A NAFION ® XR film (36 in²) was mounted on a glass plate and sprayed repeatedly with a 1% NAFION ® CR solution. After each spraying (which consumed roughly 5 g or 2.5 ml of solution), the sprayed film was dried in a vacuum oven at 200° C. for 3-12 hours. Two membranes were prepared: one sprayed three times and the other sprayed eight times. Both membranes were examined with ATR (Attenuated Total Reflectance) on a Nicolet Fourier Transform Infrared Spectrometer and NAFION ® CR was indeed found to be present on one surface.

An unsprayed NAFION ® XR film was used as a control. All three membranes were tested in a chloralkali lab cell at 90° C., 3.1 kA/m², and about 32% NaOH. The results are shown in FIG. 1.

Although the absolute current efficiencies are low, there is a definite increasing trend in the data. As more solution of the fluorinated polymer is sprayed on the film, the anion rejection increases. A fewer number of coats may leave gaps or cracks upon evaporation of the solvent. As more is sprayed onto the film, it is believed that these cracks or gaps are filled in to make a more uniform coating. To improve the coating even further, more coats are needed and hot spraying the solution or heating the film upon spraying may produce a more uniform film.

Membrane Repair

A 2% solution of 4 parts NAFION® XR to 1 part NAFION® CR was made by mixing 3.2497 grams of ground NAFION® XR with 0.8121 grams of ground NAFION® CR in 198.93 grams of perfluorotetradecahydrophenantrene that was gently refluxing in a round-bottom flask. The mixture was boiled for about 30 minutes, removed from heat and cooled enough to pour into a flint glass jar.

A cell-sized piece of perfluorinated ion exchanged membrane (commercially available from E. I. du Pont de Nemours and Company as NAFION® N90209) was swelled in 2% caustic and mounted in a laboratory size electrolytic cell. The caustic was adjusted to about 32% and the membrane ran for a few days under these conditions, reaching about 93% current efficiency. The membrane was demounted and rinsed. It was then punched four times with a pushpin (with the positions noted) and dried overnight. When dry, the membrane was daubed with the NAFION® solution twice on the cathode side and twice on the anode side. The membrane was dried again overnight and remounted in the same cell for comparison with the previous run. The operational properties of the electrolytic cell are reported below:

| Days on Line | Voltage (V) | Current Efficiency (%) | NaOH (wt %) | Power Consumption | Temp. (°C.) | Current Density (kA/m²) |
|---|---|---|---|---|---|---|
| 2 | 3.51 | 92.6 | 30.5 | 2526 | 90 | 3.1 |
| 3 | 3.50 | 93.7 | 30.5 | 2486 | 90 | 3.1 |
| 4 | 3.49 | 93.9 | 31.7 | 2489 | 90 | 3.1 |
| 5 | 3.50 | 93.9 | 30.8 | 2482 | 90 | 3.1 |
| 8 | 3.49 | 94.3 | 32.7 | 2485 | 90 | 3.1 |
| Membrane taken down, pin-holed, and repaired ||||||
| 11 | 3.52 | 91.4 | 33.1 | 2591 | 90 | 3.1 |
| 12 | 3.47 | 90.3 | 32.8 | 2583 | 90 | 3.1 |

The results indicate that the repaired membrane advantageously maintains very good current efficiency and satisfactory cell voltage even after the membrane was disabled with pinholes.

Glossary of Terms

NAFION® CR means a copolymer of tetrafluoroethylene ("TFE") and 2,2,3,3-tetrafluoro-3-[1',2',2'-trifluoro-1'-trifluoromethyl-2'-(1",2",2"-trifluoro-ethyloxy)ethoxy] propanoic acid, methyl ester, the polymeric structure of which is

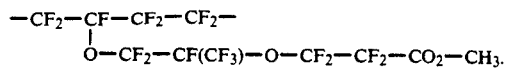

The equivalent weight is about 1050.

NAFION® XR means a copolymer of tetrafluoroethene and perfluoro[2-(fluorosulfonylethoxy)-propyl] vinyl ether, the polymeric structure of which is

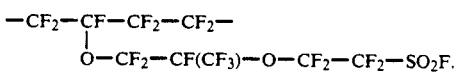

where n is 5-13 and the equivalent weight of polymer is about 1080.

What is claimed is:

1. A process for making an ion exchange membrane or film comprising
   (a) selecting a solvent from the group consisting of (i) a perfluorinated cycloalkane, (ii) perfluorinated aromatic compounds, and (iii) perfluorotrialkylamines; said solvent having a critical temperature of greater than about 150° C.;
   (b) dissolving the alkyl ester form of a carboxylic fluorinated polymer having an equivalent weight of more than about 900 and containing tetrafluoroethylene units or a blend of said carboxylic fluorinated polymer and a sulfonic fluorinated polymer in said solvent to form a solution; and
   (c) solution casting said solution to form a film or membrane.

2. The process as recited in claim 1 wherein said polymer is a perfluorinated cycloalkane substituted with one or more perfluoroalkyl or perfluoroalkylene groups.

3. The process as recited in claim 1 wherein said polymer contains the side chain OCF₂CF(CF₃)OCF₂CF₂COOCH₃.

4. The process as recited in claim 1 wherein said solvent is perfluorotetradecahydrophenanthrene, perfluoromethylcyclohexane, perfluoro decalin, hexafluorobenzene or perfluorotrihexylamine.

5. The process as recited in claim 1 wherein said solvent is perfluorotetradecahydrophenanthrene.

* * * * *